Feb. 20, 1945.  E. L. WIEGAND  2,369,878
SEPARATION
Filed May 2, 1941  6 Sheets-Sheet 3

EDWIN L. WIEGAND
INVENTOR
ATTORNEYS

Feb. 20, 1945.  E. L. WIEGAND  2,369,878
SEPARATION
Filed May 2, 1941  6 Sheets-Sheet 4

Edwin L. Wiegand
INVENTOR
ATTORNEYS

Feb. 20, 1945. E. L. WIEGAND 2,369,878
SEPARATION
Filed May 2, 1941 6 Sheets-Sheet 5

Edwin L. Wiegand
INVENTOR
ATTORNEYS

Feb. 20, 1945.　　　　E. L. WIEGAND　　　　2,369,878
SEPARATION
Filed May 2, 1941　　　　6 Sheets-Sheet 6

EDWIN L. WIEGAND
INVENTOR
BY Freeman Swent and Albrecht
ATTORNEYS

Patented Feb. 20, 1945

2,369,878

UNITED STATES PATENT OFFICE 2,369,878

SEPARATION

Edwin L. Wiegand, Pittsburgh, Pa., assignor to Orefraction Incorporated, Pittsburgh, Pa., a corporation of Pennsylvania Application May 2, 1941, Serial No. 391,531

15 Claims. (Cl. 209—496)

My invention relates to separation, such as provided in hydraulic material settling means of various types, and the principal object of my invention is to provide new and improved separations. More particularly, my invention relates to hydraulic material settling means in which means is provided for automatically discharging underage of the settling means, and a further object of my invention is to provide new and improved hydraulic settling means embodying underage discharge means and in general to provide new and improved underage discharge means for hydraulic settling means of various types. This application is a continuation in part of my application Serial Number 293,264, filed September 2, 1939.

In the drawings accompanying this specification, and forming a part of this application, I have shown, for purposes of illustration, several forms of apparatus, and in these drawings.

The particular apparatus illustrated in Figures 1 through 12 comprises, in general, hydraulic separating means S, feed means F for feeding particles to the hydraulic separating means S, and control means C for controlling the discharge of underage from the hydraulic separating means S. Material fed by the feed means F to the hydraulic separating means S is separated into two fractions, one of which, the underage, eventually is discharged from the lower end of the apparatus through discharge spud means 4, and the other of which, the overage, is discharged from the upper end of the hydraulic separating means S.

The particular hydraulic separating means S in the embodiment of Figures 1 through 12 is designed to operate by that method of hydraulic countercurrent separation commonly known as hindered settling, and includes a settling column or tube 5 cylindrical in form and having at its upper end a conical portion 6 terminating in an upper margin 7 over which the overage from the hydraulic separating means S is adapted to be discharged into a launder 8 comprising a generally cylindrical portion 9 surrounding and spaced from the settling tube 5 and the conical portion 6 and provided with an inclined bottom 10 having a water-tight joint 11 with the tube 5. The upper edge of the launder 8 is provided with a conical portion 12 spaced from the conical portion 6 of the settling column 5 and having its upper margin 12a spaced from and slightly below the upper margin 7 of the conical portion 6. The launder 8 is provided with a discharge spout 13 through which the overage is discharged.

The means F for feeding material to the hydraulic separating means S includes a generally Y-shaped pipe fitting P comprising a stem portion 15 and an arm 14 extending upwardly at an angle therefrom and having threaded thereinto the bushing 16 of a hose 17 leading from the supply of particles to be separated. Threaded into the lower end of the stem portion 15 is an inlet spud or pipe 18 extending through and suitably fastened to a ring 19 herein supported by four rods 20 threaded into the ring 19 and supported at their outer ends by brackets 21 suitably fastened to the conical upward extension 6 of the settling tube 5. Desirably there is provided below the outlet end of the inlet spud 18 a baffle 22 adjustable axially up and down with respect to the discharge end 23 of the inlet spud and to this purpose having suitably fastened thereto three upwardly extending small rods 24 in turn suitably fastened to a sleeve 25 disposed about and fitting slidably on the inlet spud 18. One or more set screws 26 may be provided to fasten the sleeve 25 in the desired position on the inlet spud 18. The baffle 22 is here shown as dished upwardly, to present a convex face to the material discharged from the inlet spud 18, and desirably is provided with a suitable number of perforations 27, of desired size, indicated in Figure 11. As will be understood by those skilled in the art, the baffle 22 serves to break the downward movement of the material, and to avoid turbulence, and to cause the material to be more uniformly introduced to the settling tube 5.

Figures 2A, 2B, 5:
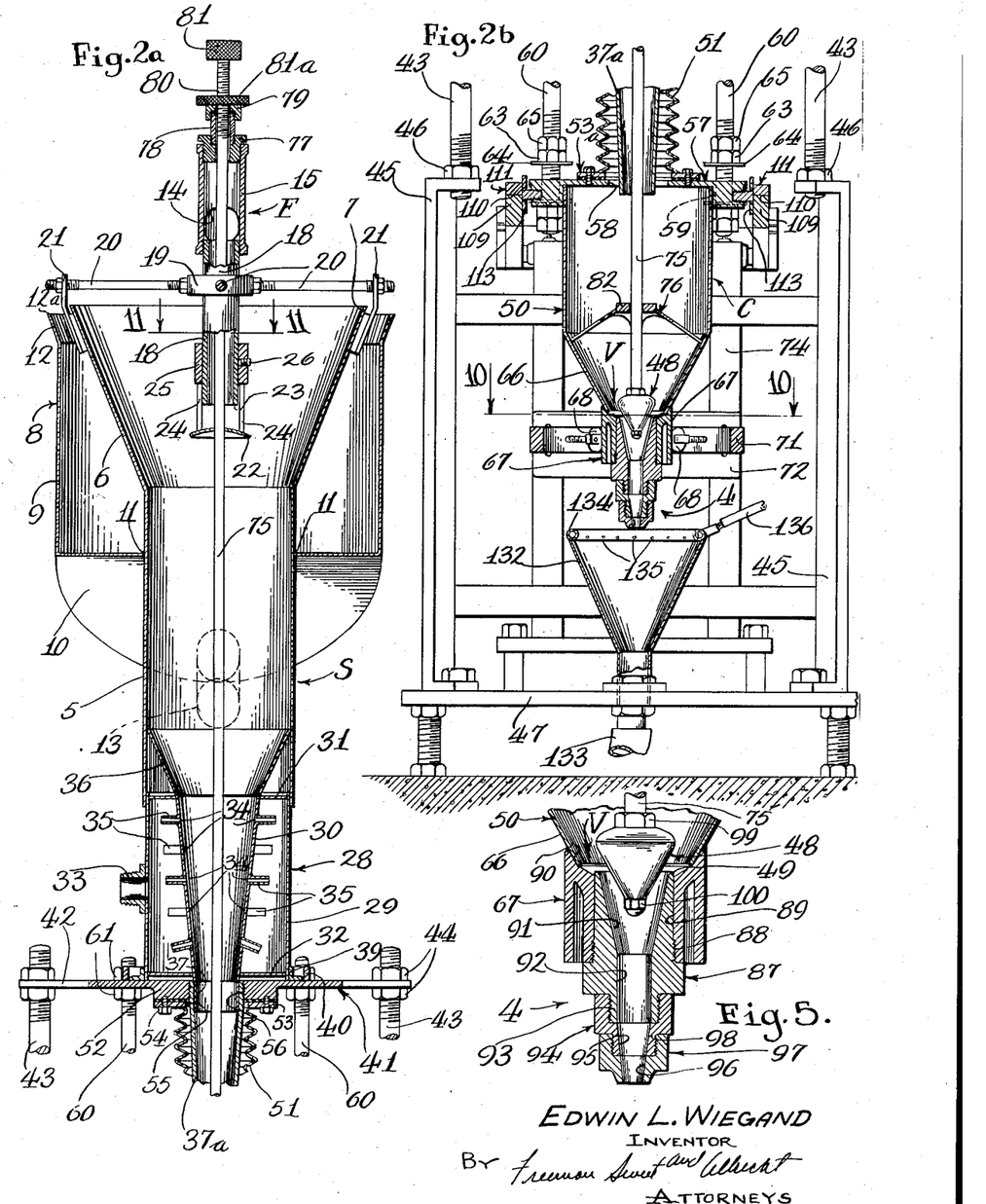
Figure 2a and Figure 2b are fragmentary vertical sectional enlarged views of the apparatus shown in Figure 1, Figure 2a showing the upper portion of the apparatus and Figure 2b showing the lower portion of the apparatus, on the section line 2—2 of Figure 1, looking in the direction of the arrows.
Figure 5 is a view, on an enlarged scale, of a fragment of the section shown in Figure 2b.

At the lower end of the settling tube 5, suitably fastened thereto, is provided means 28 for admitting water, here shown as including a cylindrical jacket 29 within which is disposed a conical member 30. The space between the jacket 29 and the conical member 30 is closed at the top and bottom by annular members 31 and 32, respectively, welded or otherwise fastened water-tight to the peripheries respectively of the upper and lower ends of the water jacket 29 and the conical member 30. The water jacket 29 is here shown as provided with a threaded inlet bushing 33 through which water is supplied to the space within the water jacket 29, desirably at adjusted but closely regulated pressure and at a predetermined rate controlled by a valve graduated for purposes of calibration.

The conical member 30 is here shown as provided with sets of substantially equal circumferentially spaced apertures 34 disposed in axially spaced planes with the apertures in one plane staggered axially with respect to the apertures in an adjacent plane. Each aperture 34 may be provided with an inlet tube 35 suitably fastened to the conical member 30 to register with the margin of the aperture. The lowermost row of circumferentially spaced apertures 34 is here shown as having the tubes 35 connected thereto extending upwardly at an angle of approximately 15° with the horizontal, but this is not essential. Owing to the comparatively large number thereof, the apertures 34 have been indicated in Figure 9 more or less diagrammatically.

Registering and connected by a water-tight joint with the upper end of the conical member 30 is the lower end of a baffle funnel 36 the upper end of which registers and is connected by a water-tight joint with the inner periphery of the settling tube 5. The conical member 30 may be provided at its lower end with a cylindrical extension 37. The lower end of the water jacket 29 is here shown as having suitably fastened thereto an angle ring 39 seated within an annular upwardly extending rib 40 on a support plate 41, and the angle ring 39 may be suitably fastened to the support plate 41 as may be desired.

The support plate 41 is here shown as provided with three circumferentially spaced outwardly extending ears 42 (best seen in Figure 9) provided with apertures in which are freely disposed threaded rods 43 each having at its upper end a pair of nuts 44 in threaded engagement therewith and engaging opposite sides of the respective ear, so that the support plate is adjustably held and supported with respect to the rods. The lower ends of the rods 43 are threaded into the upper ends of standards 45, and held by lock nuts 46, and the standards 45 are supported by and suitably fastened to a base plate 47 which may be supported in any desired manner.

The primary element of the means C for controlling the discharge of underage from the hydraulic separating means S is a valve means V including a valve body 48 which is normally relatively stationary with respect to the apparatus as a whole and a valve seat 49 which is relatively movable with respect to the apparatus as a whole. The valve seat 49 is so constructed and arranged that it is movable in unison with a movable receptacle or sump 50 the upper end of which is movably connected to receive the discharge of underage from the hydraulic separating means S by means of any suitable extensible and contractable connection, here shown as including a bellows 51.

The bellows 51 desirably is made of thin flexible metal of suitable composition, and at its upper end is suitably connected by a water-tight joint to a boss 52 extending downwardly from the support plate 41. The connection is here shown as including a ring 53 fastened to the boss 52 by screws 54 and provided with an aperture 55, and the bellows 51 is suitably fastened to the ring 53 by a water-tight joint at the margin of the aperture 55. The ring 53 is so mounted that the aperture 55 is concentric with an aperture 56 in the boss 52. The lower end of the bellows 51 is suitably fastened with a water-tight connection to a cover plate 57 provided with a central aperture 58 concentric with the bellows. The lower end of the bellows 51 herein is fastened to the cover plate 57 by a connection 53a, in the manner already set forth in which the upper end of the bellows 51 is fastened to the apertured boss 52.

The upper end of the sump 50 is here shown as fitting within a flange 59 extending downwardly from the cover plate 57 and is welded or otherwise suitably fastened to the flange 59 to provide a water-tight connection.

Extending downwardly through circumferentially spaced apertures in the support plate 41 are three rods 60 held to the support plate 41 by means of nuts 61. The rods 60 register with and pass freely through circumferentially spaced recesses 62 extending inwardly from the outer periphery of the cover plate 57. Each rod 60 carries at its lower end means for limiting the up or down movement of the cover plate 57, here shown as including a pair of stop nuts 63 in threaded engagement with the lower end of the respective rod 60, each nut 63 being desirably provided with a washer 64 suitably fastened thereto and large enough to abut the portions of the cover plate which margin the respective recess 62. Lock nuts 65 for the stop nuts 63 may be provided. The stop nuts 63 may of course be adjusted on the threaded lower ends of the rods 60 to limit up or down movement of the cover plate 57. One of the stop nuts 63 and its associated lock nut 65 have been broken away in the right hand part of Figure 6 to more clearly show the respective recess 62.

The sump 50 is here shown as having its lower portion 66 of conical form, and as having the lower end of the portion 66 fastened to a bushing 67 which is cylindrical in cross-sectional outline and is guided for axial movement by four equally circumferentially spaced rollers 68 each mounted for rotation on a shaft carried by a clevis 69 carried by a rod 70 threaded and suitably fastened to a ring 71. The ring 71 may be supported in any suitable way, and is here shown as provided with an integral bracket plate 72 fastened by means of screws 73 to a pair of channel shaped standards 74 which are suitably supported by the base plate 47.

Desirably there is provided a pipe 37a which in effect forms an extension of the tubular portion 37 and is here shown as threaded into the aperture 56 in the support plate 41, the relation of the parts being such that the tubular portion 37 fits inside the upper end of the pipe 37a. The pipe 37a extends downwardly through the bellows 51 to a point a desired distance (as will more fully appear) below the margin of the aperture 58 in the cover plate 57. The pipe 37a is here shown as tapering downwardly, but this is not essential. The pipe 37a serves to conduct the underage from the tubular portion 37 directly into the sump 50, and the construction is such that if the sump fills to the level of the aperture 58 in the cover plate 57, air is trapped in the space between the bellows 51 and the pipe 37a, so that the bellows 51 is kept free of underage. In certain embodiments of my invention the pipe 37a, or its equivalent, is extended downward further, so that not only will air be trapped in the bellows 51 but a substantial amount of air will also be trapped in the upper part of the sump when the underage or liquid level in the sump rises to the lower end of the pipe 37a.

The valve body 48 is here shown as carried at the lower end of a valve rod 75 which extends upwardly through a valve rod support 76, the sump 50, the bellows 51 (or pipe 37a), the hydraulic separating means S, the inlet spud 18, and the portion 15 of the inlet means F. Thence the valve rod 75 extends through a bushing 77 screwed into the upper end of the portion 15, a sleeve 78 threaded into the top of the bushing 77, and a packing gland 79 threaded onto the outer periphery of the upper end of the sleeve 78 and provided with a threaded aperture with which cooperate threads 80 on the upper end of the valve rod 75. Thereby, turning the valve rod 75 adjusts the position of the valve body 48 axially with respect to the valve seat 49.

For convenience, the upper end of the valve rod 75 is provided with a knurled knob 81. Also, the valve rod 75 is provided with a lock nut 81a, to lock the valve rod and valve in adjusted position.

Under non-operating conditions, when the sump 50 is in its uppermost position, the cover plate 57 being against the stop nuts 63, the knob 81 is turned so as to screw down the valve body 48 against the valve seat 49. Thus the valve V is closed when the sump 50 is empty, and it is also closed if, under operating conditions, no solids are in the sump above the minimum level required in the sump to create incipient opening of the valve, as will more fully appear.

Figures 6, 7, 8, 9, 10, 11:
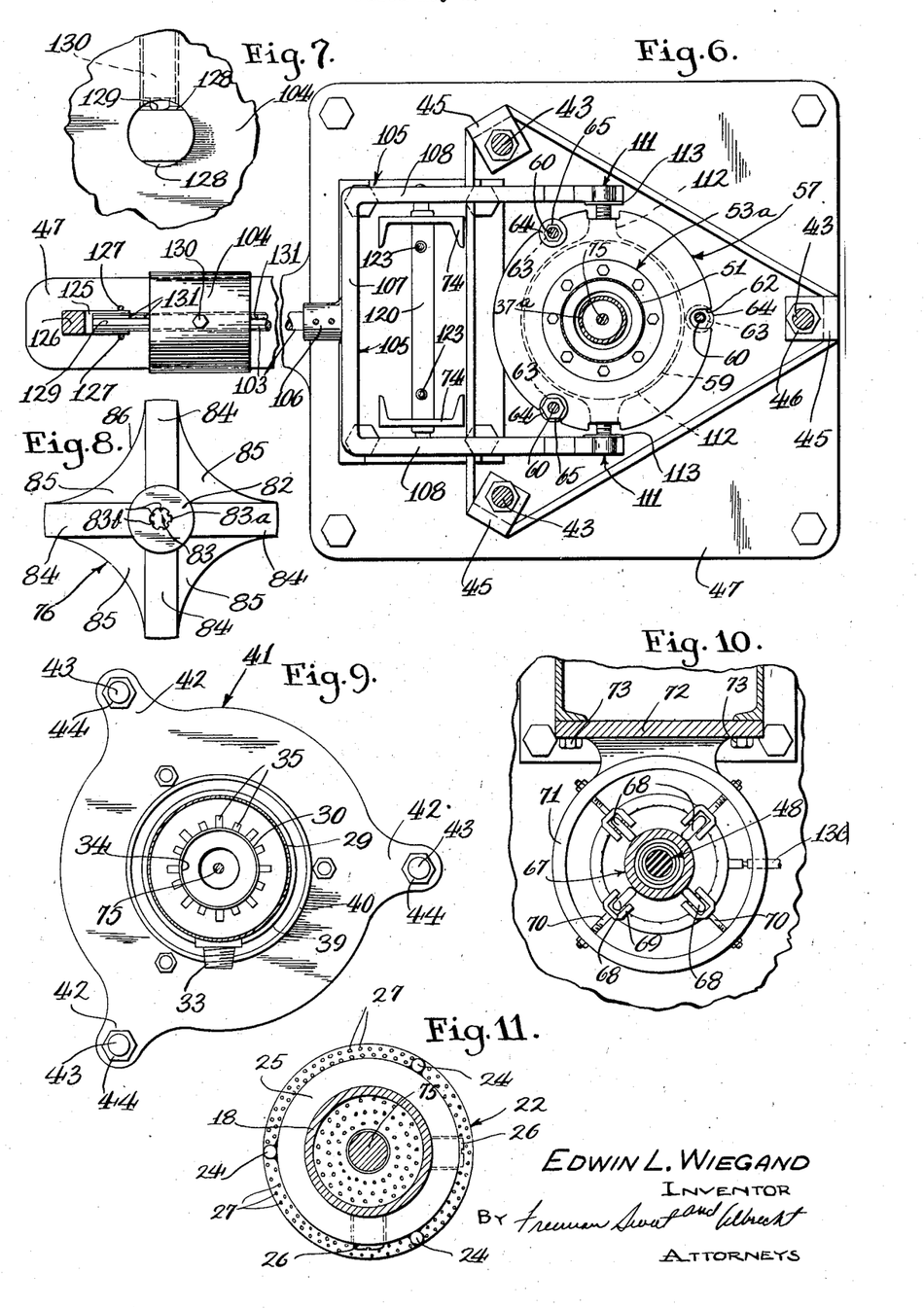
Figure 6 is a section, partly fragmentary, and on an enlarged scale, taken along the line 6—6 of Figure 1, looking in the direction of the arrows.
Figure 7 is a fragmentary end elevation of a detail.
Figure 8 is a plan view of a detail.
Figure 9 is a section, on an enlarged scale, taken along the line 9—9 of Figure 1, looking in the direction of the arrows.
Figure 10 is a fragmentary section taken along the line 10—10 of Figure 2b, looking in the direction of the arrows.
Figure 11 is a section, on an enlarged scale, taken along the line 11—11 of Figure 2a, looking in the direction of the arrows.

The valve rod support 76 is here shown as comprising a guide bushing 82 having an aperture 83 through which the valve rod 75 is slidably disposed, the bushing 82 in this instance being supported by four arms 84 the respective ends of which may be welded or otherwise suitably fastened to the bushing and to the inner periphery of the conical portion 66 of the sump 50. The space between the arms 84 may be partly baffled, as by webs 85 welded to the arms 84, better to distribute the flow of underage to the valve means V. The outer margin 86 of each web 85 is here shown as generally arcuate. Desirably the aperture 83 through the bushing 82 is somewhat larger than the valve rod 75 and is provided with a suitable number of circumferentially spaced projections 83b having limited contact with the rod 75 and providing intermediate recesses 83a large enough to permit the passage of particles such as the hydraulic separating means S is adapted to treat, thereby to keep the cooperating surfaces of the valve rod 75 and the aperture 83 free of particles and to eliminate or reduce the possibility of scoring.

The valve seat 49 is here shown as provided by a first discharge spud 87 fitting within the bore 89 of the bushing 67, having an exteriorly threaded portion 88 engaging an interiorly threaded portion of the bore 89, and projecting somewhat above the upper margin of the bore 89. The bushing 67 is here shown as having a conical recess 90 at its upper end, adapted to receive the lower end of the conical portion 66 of the sump 50, these parts being welded or otherwise suitably fastened together to provide a water-tight joint. The first discharge spud 87 is here shown as having a conical bore 91 extending downwardly from the seat 49 to a cylindrical bore 92 which extends through a threaded nipple 93 integral with the first discharge spud 87. Screwed onto the threaded nipple 93 is a second discharge spud 94 having a downwardly tapering conical bore 95 the upper end of which registers with the lower end of the cylindrical bore 92 of the first discharge spud 87. Similarly, screwed onto a threaded nipple 98 on the second discharge spud 94 is a third discharge spud 97 having a downwardly tapering conical bore 96 the upper end of which registers with the lower end of the conical bore 95 of the second discharge spud 94. As will appear hereinafter, the third discharge spud 97 may be removed, so that the discharge of underage takes place from the outlet of the second discharge spud 94, or both the third and the second discharge spuds may be removed, so that the discharge of underage takes place from the first discharge spud 87. On the other hand, any suitable and desired number of discharge spuds may be provided, these discharge spuds being for the purpose of providing a suitable final discharge opening for underage, as will more fully appear.

In the embodiment of the invention herein illustrated the spuds 87, 94, and 97, have outlet openings respectively $\frac{1}{2}$ inch, $\frac{13}{32}$ of an inch, and $\frac{11}{32}$ of an inch, in diameter, but it will be obvious to those skilled in the art that these dimensions will depend on the size of the apparatus.

The valve body 48 may be made of rubber or any other suitable material, and may be held between a nut 99 threaded about the valve rod 75 and a nut 100 threaded onto the reduced lower end of the valve rod, whereby the valve body 48 may be easily assembled with the valve rod 75. Also, the first discharge spud 87 may be screwed out of the bushing 67, and the outside diameter of the valve body 48 is either substantially the same and desirably not substantially greater than the diameter of the bore 89 of the bushing 67, thereby facilitating insertion of the valve rod 75 and valve body 48.

The control means C for controlling the discharge of underage from the hydraulic separating means S is here shown as including a beam 101 movable about fulcrum means 102 and comprising a U-shaped member 105 and an arm 103 of generally circular cross-section, flattened on the top, adapted to slidably carry a weight 104, and pinned or otherwise suitably rigidly fastened into a boss 106 on the bight 107 of the U-shaped member 105. Each of the ends of the legs 108 of the U-shaped member 105 is operatively related to the cover plate 57 which supports the sump 50, and therefore is operatively related to the valve seat 49. The operative relation between the ends of the legs 108 and the cover plate 57 in this instance is by way of knife edges and cooperating knife edge bearings (see also Figure 12), the knife edges being associated with the ends of the legs 108 of the U-shaped member 105 while the knife edge bearings are associated with the cover plate 57. To this end the cover plate 57 is here shown as having studs 111 tightly screwed into diametrically oppositely disposed bosses 112 provided on the cover plate 57, the studs 111 having V-shaped recesses 110 which provide V-shaped bearings for knife edges 109 here shown as integrally formed on the ends of the legs 108 of the U-shaped member 105. The studs 111 may be provided with washers or flanges 113 for limiting relative lateral movement of the knife edges 109 and knife edge bearings 110, to keep these parts in the desired cooperative engagement. The knife edge bearings 110 desirably are downwardly directed to minimize entrance of foreign material.

The fulcrum means 102 for the beam 101 is here shown as comprising two members 114, this being by reason of the fact that in the illustrated embodiment the fulcrum means cooperates with the two legs 108 of the U-shaped member 105. The legs 108 of the U-shaped member 105, and the fulcrum means 102, are relatively so constructed and arranged that they are adapted to have a rolling motion with respect to each other. In this instance each fulcrum member 114 has a curved upper surface 115 (best seen in Figure 4), and the cooperating surface 116 of the respective leg 108 is plane, so that when the beam 101 swings, it rolls on the fulcrum means 102. If desired, means may be provided to prevent relative sliding movement between the legs 108 of the U-shaped member 105 and the fulcrum means 102. To this end the beam and the fulcrum means may be provided with cooperating teeth, here shown as toothed racks 117 suitably fastened to the legs 108 and cooperable with fragments of toothed gearing 118 suitably fastened to the members 114. The tops of the teeth on the rack 117 and gear 118 respectively desirably are so related that they do not bottom in the grooves between the cooperating teeth, so that the surfaces 116 may roll freely on the surfaces 115.

The fulcrum members 114 are here shown as carried by and fastened in any suitable manner to the opposite ends of a shaft 119 carried in a tubular bearing 120 in turn carried by and suitably fastened to channel shaped standards 74. The shaft 119 is provided with annular recesses 122 and threaded through apertures in the tubular bearing 120 are set screws 123 adapted to engage the recesses 122 to hold the shaft 119 in a desired position. Accordingly, upon loosening the set screws 123 the fulcrum members 114 and the shaft 119 may be swung about the axis of the shaft to adjustably alter the place at which the cooperating surfaces 115 and 116 engage for any given position of the beam 101.

The free end of the arm 103 of the beam 101 is adapted to cooperate with adjustable limit screws 124 carried by lateral extensions 125 projecting from a standard 126 in turn carried by and suitably secured to the base plate 47. Two rods 127 are here shown as disposed on opposite sides of the arm 103, these rods being suitably fastened to the lateral extensions 125 and serving to guide the end of the arm 103 and prevent lateral dislocation thereof. The end of the arm 103 may be provided with flat spots 128 which are respectively adapted to engage the limit screws 124. The arm 103 is provided on its flattened upper surface with a groove 129 and extending through the weight 104 is a set screw 130 adapted to engage the groove 129. Desirably the arm 103 is provided with marks or graduations 131, and associated characters or numbers (not shown), from which the position of the weight 104 may be recorded.

The underage discharged from the spud means 4 may be received in a funnel 132 carried by the base plate 47, the lower end of the funnel being suitably connected to a pipe or conduit 133 through which the underage may be led to any desired place. There may be provided an annular pipe 134 having a connection 136 to a supply of water and provided with a plurality of apertures 135, preferably slightly downwardly directed, so that streams of water issuing therefrom will wash down any underage clinging to the funnel.

In operation, the weight 104 is adjusted and set in the optimum position on the beam arm 103, the particles to be separated are fed through the conduit 17 in a properly wetted condition, as will be understood by those skilled in the art, and at a predetermined rate, and water is admitted through the inlet bushing 33 at a predetermined rate, and flows into the conical portion 30 through the apertures 34, resulting in a rising current in the settling tube 5, effecting hindered settling of the particles, a zone being present in which so-called teetering of the particles results, whereby particles having a higher settling rate (the underage) fall through the teeter zone, into the pipe 37a, and from there into the sump 50, then through the valve means V (now open a certain amount by reason of the presence in the sump of at least the minimum of underage required to open the valve), and are discharged from the spud means 4, whereas particles having a lower settling rate (the overage) are discharged over the top of the conical portion 6 into the launder 8.

In this respect it is noted that the settling rate is a function of several factors, including specific gravity and also size, and that particles of higher specific gravity, because of smaller size, may have a like or even a lower setting rate than particles of lower specific gravity but of larger size. Therefore in separating for example to obtain the one or more kinds of particles of highest specific gravity, unless the material has been screened or otherwise sized within relatively close limits, some of the desired particles of smaller size will be lost into the overage.

The sump 50 is pressed downwardly by forces which include the weight of the sump and of the associated parts movable in unison therewith, the effective head of the water and material in the separating means S, and the weight of the underage present in the sump, but the resulting effective force on the knife edges 109 is opposed by the weight 104, and under steady conditions the sump 50 remains stationary and the effective opening of the valve means V remains the same. On the other hand, if the effective force on the knife edges 109 increases, the beam 101 will swing against the bias of the weight 104, lowering the valve seat 49 and increasing the effecting opening of the valve V. Reversely, if the effective force on the knife edges 109 decreases, the beam 101 will swing in the reverse direction, in response to the bias of the weight 104, raising the valve seat 49 and decreasing the effective opening of the valve V.

However, as soon as the beam 101 swings in either direction, the place of engagement of the beam surfaces 116 with the fulcrum surfaces 115 will be shifted toward the predominating force, and the moment arm of the predominating force will be shortened and the moment arm of the opposing force will be lengthened. Therefore the effective opening of the valve means V, for any setting of the weight 104, is determined by the downward force on the beam knife edges 109, but on any change the parts will come to rest in adjusted position promptly and without any appreciable hunting.

Other factors remaining the same, the effective force on the knife edges 109 depends on the amount of underage present in the sump 50, and the amount of underage present in the sump 50 is a function of the relation between the rate at which the underage is deposited in the sump 50 from the separating means S and the rate at which the underage flows from the sump 50 through the valve V. If the underage is delivered to the tank at a greater rate, the amount present will increase, but the increased amount will operate to increase the opening through the valve V, to increase the rate of outflow, while if the underage is delivered at a lower rate, the amount present will decrease, but the decreased amount will permit the weight 104 to decrease the opening through the valve V, to decrease the rate of outflow. Therefore the mechanism operates automatically, to adjust the opening of the valve V in response to the rate of delivery of the underage from the separating means S, to provide a rate of outflow from the sump 50 varying with the rate of delivery from the separating means S, and to maintain a satisfactory body of underage in the sump 50, regardless of change in the rate of delivery of the underage from the separating means S.

In this respect it is noted that the rate of delivery of the underage from the separating means S may vary considerably even though the rate of feed of the material to the separating means remains substantially constant, particularly because the proportions of the various ingredients contained in the material as fed to the separating means may vary widely from one instant to another. Of course, the rate of delivery of the underage from the separating means also will vary with variations in the rate of feed of the material to the separating means. However, the present mechanism adjusts automatically to compensate for variation in the rate of delivery of the underage from the separating mechanism for any reason whatsoever.

It will be understood that for the handling of a given material the apparatus will be adjusted for that material, including the input of water into the inlet bushing 33, the setting of the weight 104 on the beam arm 101, and the discharge spud means 4. Initially the optimum adjustments for any particular material may be determined by checking the quality of the output or underage, petrographically or otherwise. However, desirably the adjustments for each material are recorded, so that when it is proposed to handle that material again, all that is necessary is to set the apparatus according to the recorded adjustments for that material, whereupon the apparatus automatically will handle that material, regardless of variations in the quality or quantity of the feed, save only that the quantity does not exceed the maximum capacity of the apparatus. It will be understood that the graduations on the beam arm 103 are convenient for recording the positions of the weight 104.

The use of a suitable discharge spud aids in maintaining the discharge of underage as a solid stream, tending to prevent whirling or other turbulence which might superimpose undesired fluctuations on the discharge. The optimum discharge spud may be readily determined in conjunction with the making of the other adjustments for a given material as hereinbefore set forth. However, without the automatically controlled valve means V, on increase or decrease in the rate of discharge of overage from the hydraulic separating means S, the spud respectively would tend to choke or to empty, thereby affecting the conditions in the settling tube 5 and the hydraulic separating means S in general, and vitiating the accuracy of the separation. In fact, even with not unusual variations in the rate of discharge of underage from the separating means, the spud will become choked completely, resulting in the discharge of underage material into the accumulated overage, or conversely, will wash-out, resulting in the discharge of overage material into the accumulated underage. On the other hand, in the disclosed apparatus in general these disturbances are eliminated and avoided.

The separation of zircon and rutile from impurities will serve as an example of the separations I am able to effect. Raw sand containing zircon and rutile, contains impurities in the from of sillimanite or aluminum silicate, cyanite, and other light silicates. Zircon has a specific gravity of about 4.67 rutile about 4.2, and the impurities mentioned have a specific gravity of from about 2.7 to about 3.5. Generally speaking, with the material suitably sized, the zircon and rutile, being heavier, will be discharged as underage, and the impurities will be discharged in the overage.

With apparatus as hereinbefore described, and in which the tube 5 is but six inches in diameter, operating as herein described, and feeding such material at the rate of approximately 1650 pounds per hour, screened to minus 80 mesh and containing approximately 15% sillimanite, and with water at the rate of 450 gallons per hour, or a velocity of approximately five feet per minute in the tube 5, the underage was approximately 1014 pounds per hour, of which only 0.35 was impurities, consisting of 0.25 percent sillimanite and 0.010 percent other silicates. With other rates of feed, from 1400 pounds per hour to 2000 pounds per hour, with the material varying in percentage of impurities from approximately 8 to 10%, the percentage of impurities in the underage was approximately 0.5 to 0.75 percent.

The foregoing results are averages, and at times the percentage of impurities will run as low as 0.10 percent. For the very best results, particularly if the impurities run from 15% to 20% or more, with material which runs from about 50 mesh to about 5% minus 200 mesh, it seems desirable first to screen the material through an 80 mesh screen and then treat the two fractions separately. However, the high accuracy is apparent, and also it is apparent that this high accuracy is obtained with apparatus relatively small in size compared to the relatively large volume of material handled. At the same time, of course my invention is not limited to any particular dimensions of apparatus.

Desirably the overage is again treated for recovery of good material carried over with the impurities, and preferably this is done by running the overage directly to the feed box of another apparatus similar to the apparatus herein disclosed but preferably of large size and lower water velocity. In fact, several separating tubes may be operated in conjunction, either on overage or on underage or on both, merely if properly proportioned and controlled as to water velocity, as will be understood by those skilled in the art. Apparatus embodying my invention is particularly well adapted for use in such a series of hydraulic separating tubes, because the impurities from a previous separation vary highly over short periods of time, but the automatic control hereinbefore described results in this having substantially no effect on the accuracy of the separation. In general, this characteristic of my invention is particularly valuble in the recovery of good materials from minerals having highly varying percentages of impurities. It will be understood, however, that my invention is not limited to these particular ways of operating.

My invention may be embodied in a hydraulic jig, so that in operation underage may be automatically discharged from the jig. Furthermore, the invention may be so embodied that all of the underage of the jig is discharged under automatic control, and the embodiments may be such that the underage is discharged from the very bottom of the jig hutch or from a higher level. Furthermore, the invention may be so embodied that a part of the underage is discharged under manual control and another part is discharged under automatic control and the levels from which these parts are discharged may be as selected and suitable in any given embodiment.

Merely for the sake of convenience in description, one embodiment of my invention in a hydraulic jig having both a manually controlled underage outlet means and an automatically controlled underage outlet means will be described first. Accordingly, referring now to Figures 13 and 14 the apparatus here shown comprises a hydraulic jig 140 having a manually controlled underage outlet means 141 and an automatically controlled underage outlet means 142, as will more fully appear.

Figure 13:
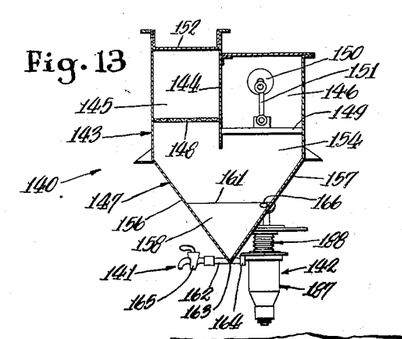
Figure 13 is a vertical sectional view, more or less diagrammatic, showing a hydraulic jig embodying my invention, and omitting details of the automatic underage discharge means.
Figure 14:
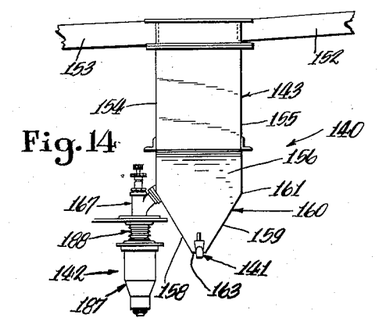
Figure 14 is a side elevational view looking at the left side of the apparatus shown in Figure 1.

The hydraulic jig 140 includes a hutch 143 divided by a wall 144 into a hopper compartment 145 for receiving the material to be treated, and a jig compartment 146, the hopper and jig compartments being in communication through a settling chamber 147. The hopper compartment 145 has a screen 148 of any suitable kind disposed across the same at the desired depth from the top of the hopper compartment. In the jig compartment 146 is disposed a piston or diaphragm 149 which may be reciprocated by an eccentric 150 and a crank 151 or in any other suitable way. The material to be treated may be in the form of a slurry, or in a suitably wet condition, or in any other suitable condition, wet or dry, and may be fed into the hopper compartment 145 by means of a conduit or flume 152, the average from the hopper compartment being discharged therefrom into a conduit or flume 153. It will be understood by those skilled in the art that reciprocation of the diaphragm 149 causes pulsations in the material in the jig, and that, speaking generally, particles of heavier material will descend down through the hopper compartment 145, through the screen 148 into the settling chamber 147, and the particles of lighter material will go into the overage and be discharged into the flume 153.

The jig hutch 143, as here shown, comprises a pair of plane vertical opposite walls 154, 155, and a pair of opposite walls 156, 157 transverse to the walls 154, 155, the walls 156, 157 inclining downwardly toward each other, and further comprises a pair of opposite walls 158, 159 transverse to the walls 156, 157, the walls 158, 159 inclining downwardly toward each other. The walls 158, 159 and the lower portions of the walls 156, 157, substantially define an inverted four-sided pyramidal discharge hopper 160, the base of the pyramidal space therewithin being at the level 161, a desired distance below the wall 144.

The manual outlet means 141 here comprises a pipe 162 which at an intermediate portion thereof communicates with the apex 163 of the pyramidal space within the discharge hopper 160. Accordingly, underage is adapted to be discharged from either end of the pipe 162. As here shown one end of the pipe 162 is closed by a cap 164 and the other end is provided with a plug cock 165. The cock 165 may be any suitable form of valve, and means (not shown) is desirably provided to indicate the setting of the movable member thereof.

The automatic outlet means 142 communicates with the hutch 143, in this instance through an opening 166 in the wall 158. The opening 166 is shown, but not necessarily placed, at approximately the level 161 of the base of the inverted pyramidal space.

Figure 15:
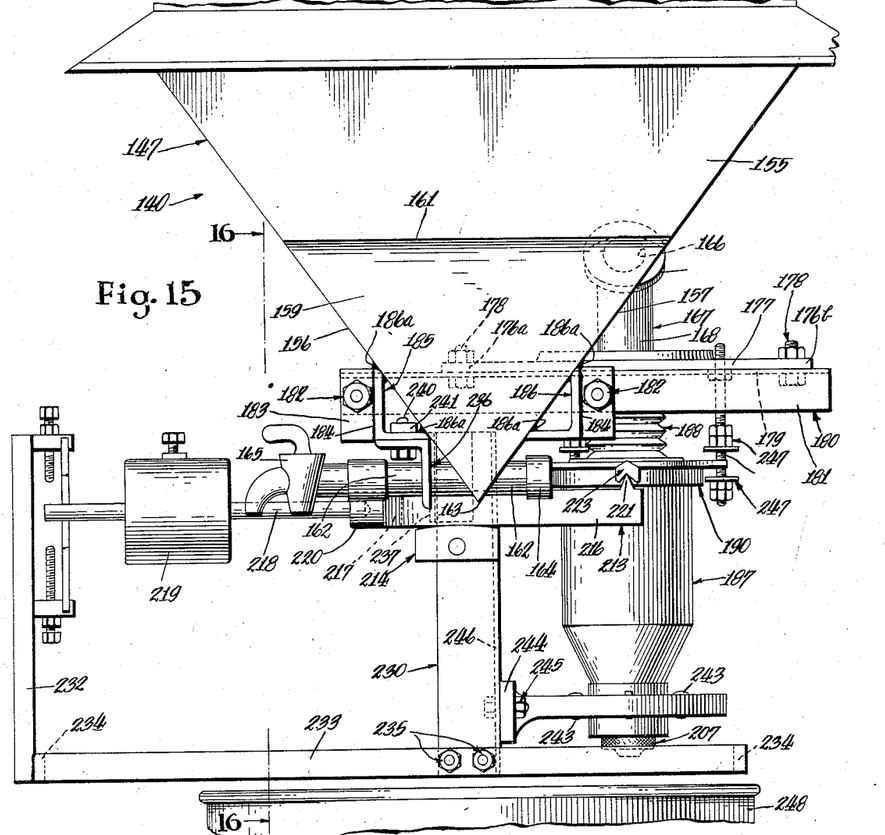
Figure 15 is an enlarged elevational view of the lower portion of the apparatus of Figure 13 viewed from the same direction as Figure 13, and including details omitted from Figures 13 and 14.
Figures 16, 17, 18:
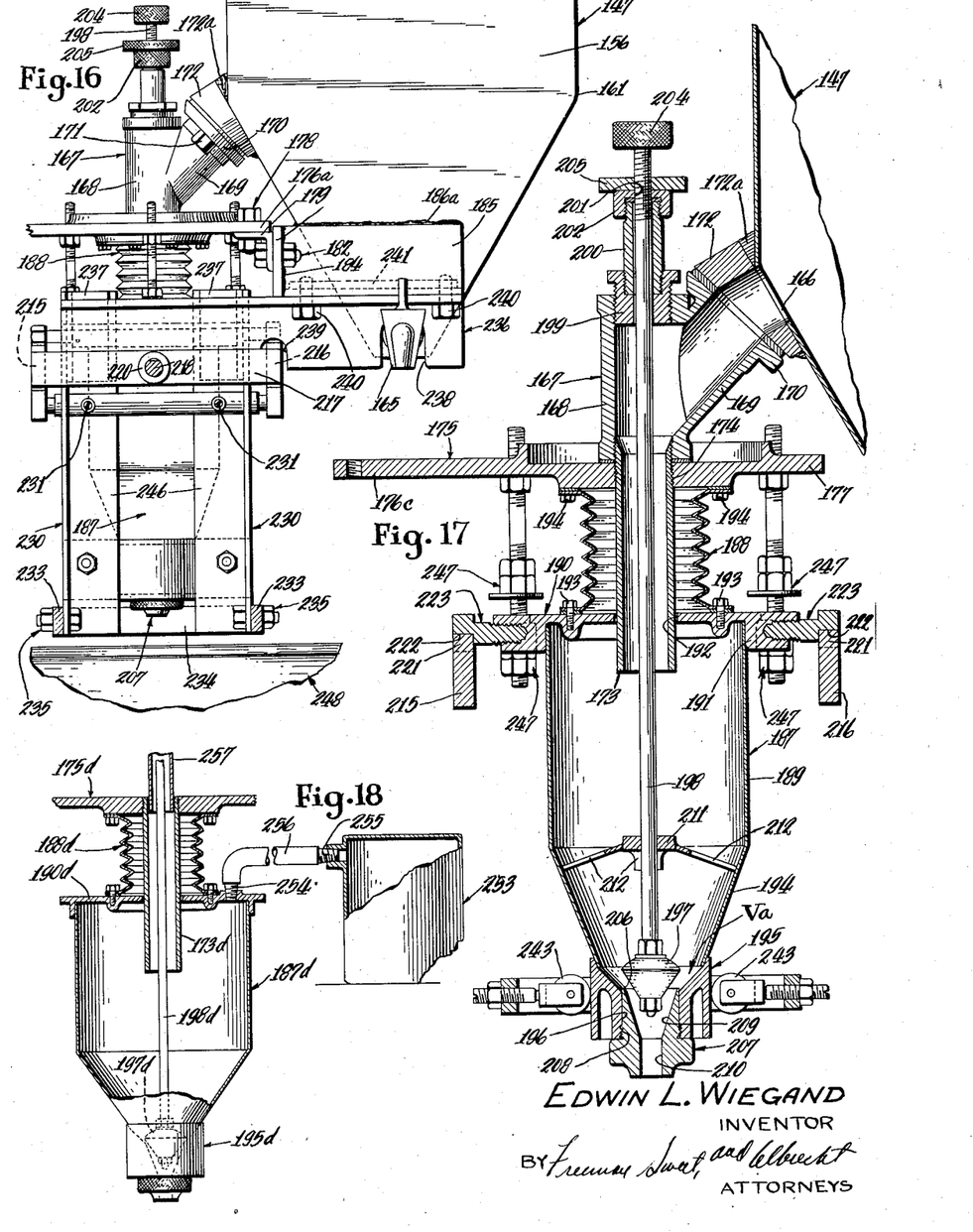
Figure 16 is an elevational view partly in section taken along the line 16—16 of Figure 15 looking in the direction of the arrows.
Figure 17 is an enlarged vertical sectional fragmentary view of a portion of Figure 16.
Figure 18 is a fragmentary vertical sectional view more or less diagrammatic, of another embodiment of an automatic discharge means.

Referring now more particularly to Figures 15, 16, and 17, the automatic underage outlet means 142 includes a pipe fitting 167 of Y-type comprising a vertical stem portion 168 and an arm 169 extending upwardly at an angle therefrom. The arm 169 has a flange 170 fastened, by bolts 171, water-tight to a flange 172 fastened by a weld 172a, to the hutch 143, so that underage is adapted to be discharged through the aperture 166 into the arm 169. Threaded into the lower end of the stem 168 is the upper end of a pipe 173 (see Figure 17) this end of the pipe being in threaded engagement through a hole 174 in a support plate 175. The stem 168 and support plate 175 are screwed together water-tight.

The support plate 175 in this instance has three ears 176a, 176b, 176c extending radially from a generally circular portion 177, the ears 176a, 176b being each fastened by a bolt and nut 178 to the horizontal side 179 of an angle bar 180 (see Figures 15 and 16). The ear 176c may be additionally supported, if desired, by means not shown. The vertical side 181 of the angle bar 180 is fastened by bolts and nuts 182 to a plate 183 in turn fastened by welds 184 to the ends of angle bars 185, 186. The angle bars 185, 186 are fastened by welds 186a to the walls 156, 157 of the hutch. The plate 175 may be supported from the hutch in any other suitable way, or may be otherwise suitably supported.

Chamber means is provided into which underage from the pipe 173 is discharged. This chamber means is shown most clearly in Figure 17, and is here shown as including a receptacle or sump 187 and a flexible connection 188 between the sump 187 and the support plate 175. The sump 187 has a cylindrical upper portion 189 and is provided with a cover plate 190 having a depending circular flange 191 in which the upper end of the cylindrical portion 189 of the sump fits and is fastened water-tight in any suitable way. The cover plate 190 has a hole 192 through which the pipe 173 freely extends. The flexible connection 188 is here shown as a metallic bellows, one extremity of the bellows being connected by screws 193 to the upper side of the cover plate 190 and the other extremity being connected by screws 194 to the under side of the support plate 175, these connections being water-tight.

The lower portion 194 of the sump 187 is of conical form and its lower extremity is welded or otherwise suitably fastened water-tight to a bushing 195 having a central hole 196 through which a conical valve body 197 is adapted to pass. The valve body 197 may be made of rubber or any suitable material, and may be supported by and removably fastened in any suitable way to the end of a valve rod 198 which extends upwardly through the pipe 173, through the stem 168, freely through a bushing 199 screwed into the upper end of the stem 168, and freely through a sleeve 200 threaded into the top of the bushing 199, the upper end of the valve rod being threaded through a hole 201 of a packing gland nut 202 which is threaded onto the outside of the upper end of the sleeve to give a water-tight connection between the rod 198 and packing 203. By turning a knob 204 at the upper end of the valve rod 198 the position of the valve body 197 may be adjusted. If desired, a lock nut 205 may be provided to tighten the rod 198 in adjusted position. It will be noted that in this embodiment the valve rod 198 does not pass through the settling means (in this instance the jig) in which the automatic discharge means is embodied. The advantages of this construction may of course be secured in forms of settling means other than a jig.

The valve body 197 forms part of a valve Va, analogous to the valve V, the valve body 197 being adapted to cooperate with the upper margin 206 of a spud 207, the margin 206 serving as a valve seat for the valve body 197. The spud 207 fits in the hole 196 in the bushing 195 and is held therein by cooperating threads 208 in the bushing and on the spud. The spud shown provides a discharge passage including a conical portion 209 extending from the seat 206 to a cylindrical outlet portion 210. Discharge spuds having different sized outlet portions may be substituted for the spud 207, and a plurality of spuds may be provided such as comprised in the spud means 4 of Figure 5 if desired.

If desired a guide bearing 211, through which the valve rod 198 freely passes, may be provided, this bearing being here shown as supported by circumferentially spaced legs 212; and the construction and arrangement may be similar to that described in connection with the bushing or guide bearing 82 of Figure 2b and Figure 8.

The means for automatically controlling the discharge of underage from the discharge spud 207 is here shown as including a beam 213 movable about fulcrum means 214 and comprising a U-shaped member (similar to the U-shaped member 105 of the embodiment of Figures 1 through 12) having legs 215, 216 joined by a cross-piece or bight 217, and an arm 218 adapted to slidably carry a weight 219, the arm 218 being pinned or otherwise suitably rigidly fastened into a boss 220 on the bight 217 of the U-shaped beam member. Each of the ends of the legs 215, 216 of the U-shaped member is operatively related to the cover plate 190 which supports the sump 187 and therefore is operatively related to the valve seat 206. The operative relation between the ends of the legs 215, 216 and the cover plate 190 in this instance is by way of knife edges 221 and cooperating knife edge bearings, the knife edges 221 being associated with the ends of the legs 215, 216 of the U-shaped member while the knife edge bearings 222 are associated with the cover plate 190. To this end the cover plate 190 is here shown as having studs 223 (see Figure 17) tightly screwed into diametrically oppositely disposed bosses provided on the cover plate 190, the studs having V-shaped recesses which provide the V-shaped bearings 222 for the knife edges 221 here shown as integrally formed on the ends of the legs 215, 216 of the U-shaped beam member.

The fulcrum means 214 for the beam 213 is here shown as constructed and arranged similarly to the fulcrum means 102 and beam 101 of the embodiment of Figures 1 through 12, that is, the legs 215, 216 of the U-shaped member, and the fulcrum means 214, are relatively so constructed and arranged that they are adapted to have a rolling motion with respect to each other, each fulcrum member having a curved upper surface (best seen in Figure 15), and the cooperating surface of the respective legs 215, 216 being plane, so that when the beam swings, it rolls on the fulcrum means. If desired, parts such as 117, 118 of Figure 4, or any other suitable means, may be provided to prevent relative sliding movement between the legs 215, 216 and the fulcrum means 214.

The members of the fulcrum means are here shown as carried by and fastened in any suitable manner to the opposite ends of a shaft carried in a tubular bearing in turn carried by and suitably fastened to two standards 230 here shown as made of angle bars. Threaded through apertures in the tubular bearing are set screws 231 (see Figure 16) adapted to engage the shaft and hold it in a desired position. Accordingly, upon loosening the set screws 231 the shaft and the fulcrum members may be swung about the axis of the shaft to adjustably alter the place at which the cooperating surfaces of the members of the fulcrum means 214 and the legs 215, 216 engage for any given position of the beam 213, similarly as has been described in connection with the embodiment of Figures 1 through 12.

Figures 1, 3, 4, 12:
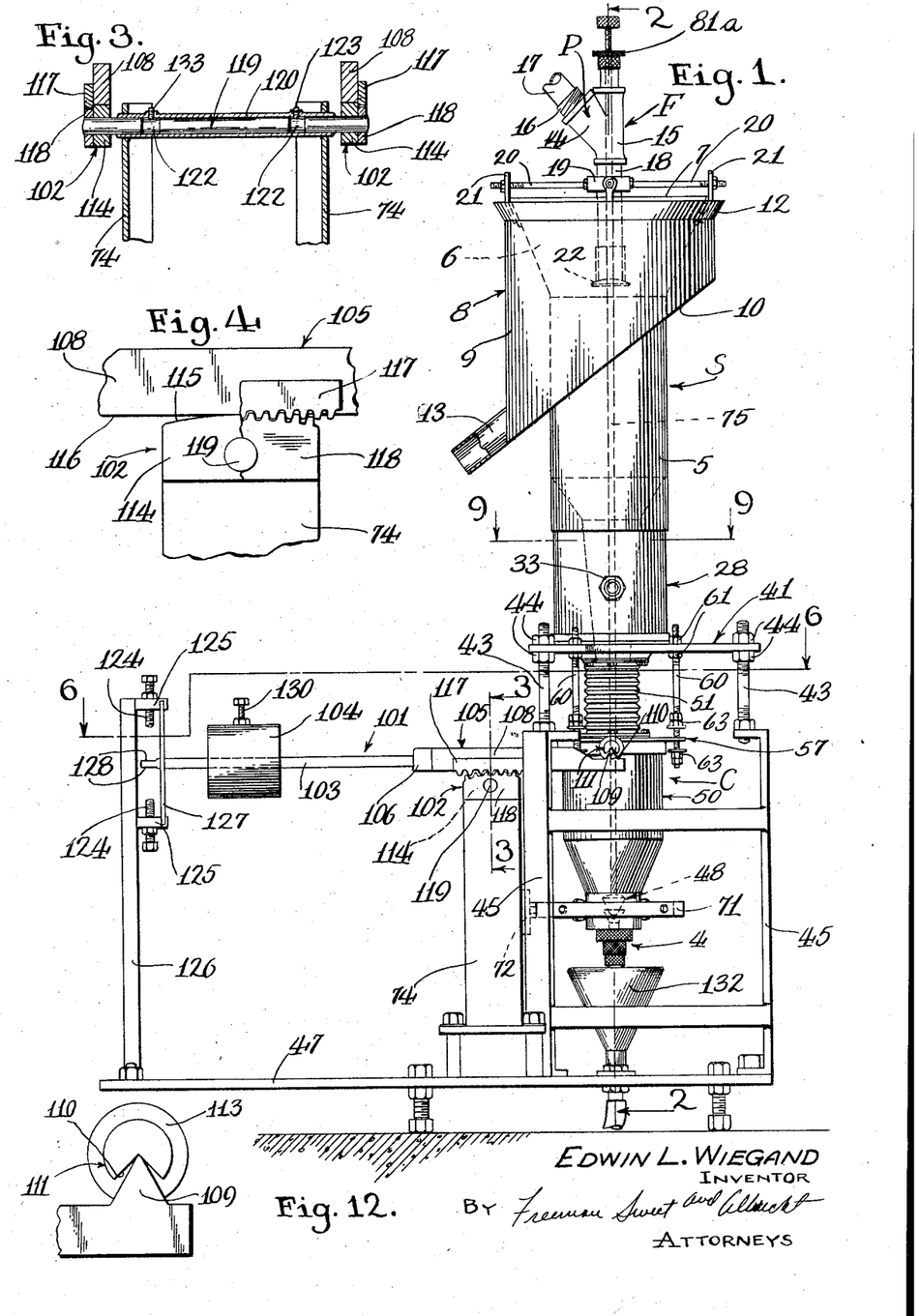
Figure 1 is a side elevation of one illustrative form of apparatus.
Figure 3 is a fragmentary section, on an enlarged scale, taken along the line 3—3 of Figure 1, looking in the direction of the arrows.
Figure 4 is a fragmentary view of a detail of Figure 1, on an enlarged scale.
Figure 12 is a fragmentary side elevation of a detail.

The free end of the arm 218 of the beam is adapted to cooperate with adjustable limit screws and vertical guide rods, similar to the screws 124 and guide rods 127 of Figure 1, these screws and guide rods being carried by a standard 232 in turn carried in any suitable way, as by a frame comprising bars 233 and cross bars 234, the bars 233 being fastened by bolts and nuts 235 to the angle bar standards 230. The weight 219 may be adjusted and fastened in adjusted position and its position noted and recorded as already described in connection with the weight 104 of the embodiment of Figures 1 through 12.

The standards 230 may be supported in any suitable way and are here shown connected to the vertical side of an angle bar 236 by welded angle pieces 237. The vertical side of the angle bar 236 has a recess 238 to accommodate the pipe 162, and a recess 239 to accommodate the leg 216 of the beam. The horizontal side of the angle bar 236 is fastened to the horizontal side of the angle bar 185, by bolts 240 threadedly engaging threaded holes in a bar 241.

The lower end of the sump 187 may be guided, in the same way as the sump 50, by a plurality of circumferentially spaced rollers 243 adapted to engage the cylindrical outer surface of the bushing 195. The rollers are adjustably carried in any suitable way by a ring member having a tangential flange 244 which is fastened by bolts and nuts 245 to sides 246 of the angle bar standards 230.

The vertical upward and downward movement of the sump 187 may be limited by a plurality of circumferentially spaced limit stops 247, there being one set above the cover plate 190 and one set below. These limit stops are adjustably carried on rods in turn carried by the support plate 175, and they cooperate with the cover plate 190 in the manner already described in connection with the limit stops 63, 64 of the embodiment of Figures 1 through 12.

A receptacle 248, fragmentarily shown in Figure 15, may be provided to receive the underage discharged from the spud 207 and from the cock 165.

As shown in Figure 17 the lower end of the pipe 173 is a substantial distance below the lower surface of the cover plate 190, so that when the liquid or underage level in the sump 187 rises to the lower end of the pipe, a substantial volume of air will be trapped in the upper portion of the sump, this volume being a substantial percentage of the total volume of the sump. Of course air will also be trapped in the space between the pipe 173 and the inside surface of the bellows 188, so that in normal operation of the device no liquid or underage will be present within the bellows 188.

Considering now the operation of the apparatus shown in Figures 13 through 17. The automatic discharge means 142 is so adjusted that if there is only liquid and no solid material in the sump 187 the valve Va is completely closed, and the valve remains closed, or recloses completely, if no solids are supplied to the sump above the minimum level required in the sump to create incipient opening. Assume now that the apparatus is placed in operation and that underage material is settling in the liquid in the jig into the settling chamber 147 of the jig in the well known way.

Since the pipe 173 is connected through the T fitting 167 to the jig hutch and the pipe 173 discharges into the sump 187, the material in the pipe and in the sump will be of whatever character is present at the time at the level of the opening 166. Under certain conditions the liquid level of the material in the sump 187 will rise to the lower end of the pipe 173, and any further rise in level will cause compression of the air trapped as hereinbefore described. It will be understood that part of the material in the sump may be water and the remainder particles of underage material, in proportions which may vary. Let it be further assumed that the cock 165 is so set that it is adapted to discharge underage at a rate corresponding approximately to the minimum rate of yield of underage material from the material fed into the jig. Under these conditions it may be assumed that underage has accumulated in the bottom of the settling chamber 147 and that the underage level therein has risen to the opening 166 and consequently as underage continues to accumulate, the excess underage will flow through this opening and thence into the pipe 173 and into the sump 187. When enough underage has accumulated in the sump 187 to cause the sump to move downwardly a certain amount, the valve Va is opened a certain amount, thereby causing discharge of underage from the spud 207 at a rate dependent upon the amount of valve opening.

It will be evident that the mechanism 142 operates automatically to adjust the opening of the valve Va in response to the rate of delivery of the underage to the sump, to provide a rate of outflow from the sump varying with the rate of delivery to the sump, and to maintain a satisfactory body of underage in the sump, regardless of change in the rate of delivery of the underage to the sump, as explained in connection with the embodiment of Figures 1 through 12.

By providing a pipe 173 of suitable length, a substantial normal variation of liquid level in the sump 187 is permitted, between a level at the lower end of the pipe and a level at approximately the lower side of the cover plate 190. Between these levels the trapped body of air is more or less compressed. The sensitivity of the automatic discharge device is materially increased by the provision of a trapped substantial volume of air as described, so that the device responds to a lesser change in weight of the solid material in the sump. It will be understood that the material in the sump 187 may comprise liquid up to a certain level more or less above the lower end of the pipe 173, and settled wet solid material to a level more or less below the liquid level.

Furthermore, when my invention is embodied in a jig or like device in which the liquid in the device is subject to pulsations, the compressibility of the trapped body of air above the level of material in the sump 187 tends to cushion or absorb these pulsations so as to minimize the effect thereof on the valve Va.

In addition to such possible variables as rate of feed of material, character of the feed at any given instant, or any other factor affecting the rate of yield of underage in the jig, the rate of discharge of underage through the aperture 166 into the sump 187 also will depend upon the setting of the cock 165 in an embodiment of the type of Figure 13. However, the apparatus adjusts automatically to compensate for variation in rate of yield of underage for any reason. An instance in which no discharge cock such as 165 is utilized is referred to hereinafter.

Figure 19:
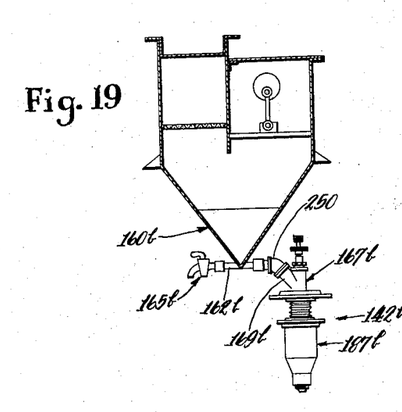
Figures 19 and 20 are views respectively similar to Figure 13 but showing other embodiments.

Referring now to Figure 19 there is here shown a jig similar to the jig shown in Figure 13. In Figure 19 parts similar to those in Figures 13 through 17 have the same reference numerals with the suffix *b* added. In Figure 19 the pipe 162b instead of being provided with a cap 164 as in the case of Figure 13, is suitably connected by pipe connection means 250 with the arm 169b of the Y pipe fitting 167b which is connected to an automatic discharge means 142b. It will be understood that the sump 187b is counter-balanced by a suitably fulcrumed beam, and weight, such the beam 101 and weight 104, as fully set forth in connection with the previously described embodiments. The other end of the pipe 162b has connected thereto a plug cock 165b. Thus underage material is dischargeable from the bottom of the discharge hopper 160b of the jig through both the cock 165b and the automatic discharge means 142b.

Figure 20:
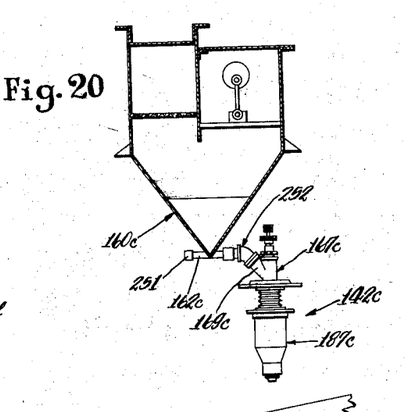

Referring to Figure 20, in which parts similar to those in Figures 13 through 17 have the same reference numerals with the suffix *c* added, there is here shown a jig, similar to the jig shown in Figure 13, provided with an automatic discharge means 142c. Under certain conditions a discharge cock, such as 165, may be omitted and instead an end of the pipe 162c closed by a cap 251, the other end of the pipe 162c being connected through pipe connection means 252 to the arm 169c of the Y pipe fitting 167c in turn connected to the automatic discharge means 142c which then serves as the only outlet for underage material from the discharge hopper 160c. It will be understood that the sump 187c is counter-balanced by a suitably fulcrumed beam, and a weight, such as the beam 101 and weight 104 as fully set forth in connection with the previously described embodiments.

It will be evident from the embodiment of Figure 20 that my invention may be embodied in a jig, for example, as well as in other types of hydraulic settling means, without the use of any manually controlled or non-automatic means for discharging underage. It of course will be evident that if only an automatic underage discharge means is provided, the capacity of this means will have to be sufficient to discharge the underage at a suitable rate. Accordingly it may be desirable under some circumstances, whether the invention be embodied in a jig or some other hydraulic settling means, to provide, in addition, a non-automatic underage discharge means in order to keep down the size of the automatic means that might otherwise be necessary to attain the desired discharge characteristics.

In certain embodiments of the invention it may be desirable that the length of the pipe which feeds underage into the sump be such that the lower end of the pipe will be still further below the underside of the cover plate of the sump than in the embodiment of Figure 17, so that the volume of air trapped in the upper portion of the sump will be a desired still larger volume. Furthermore, the volume of air trapped when the liquid or underage level reaches the lower end of the pipe may be increased, without undesirable enlargement of the sump, by placing the space in which the air is trapped in communication with a sealed auxiliary chamber or tank or any suitable receptacle. This is shown diagrammatically in Figure 18 in which parts analogous to those shown in Figure 17 are given the same reference numeral with the suffix *d*. In Figure 18 a sealed tank 253 is shown connected to the air space which will be present above the liquid level in the sump 187d when the liquid level rises to and above the lower end of the pipe 173d. In this instance the connection comprises a nipple 254 threaded airtight into a hole in the cover plate 190d, a nipple 255 threaded airtight into a hole in the tank 253, and a suitable flexible conduit 256 connected airtight to the nipples.

In Figure 18, the numeral 257 indicates any pipe, for example a tubular part such as 37 of Figure 2a, or any conduit through which underage may be discharged into the pipe 173d, but, of course, the pipe 173d may be adapted to be connected to a Y pipe fitting such as the fitting 167 in Figure 13, for example, or to receive underage in any other suitable way.

The provision of a substantial volume of trapped air, or an extra large volume of trapped air, is advantageous whether or not the automatic discharge means is embodied in a jig or in a hydraulic settling means using a continuous hydraulic counter-current, or in a hydraulic settling means of any other suitable type. However, provision of a large volume of trapped air is not essential when my invention is embodied in types of hydraulic material settling means or separating means in which the material treated comprises underage solids of rapidly settling kind, but its use in such types of apparatus is not excluded, and in certain types, of which jigs are one example, even though the underage solids may be of relatively rapidly settling kind, a substantial volume of air has special advantages. An extra large volume of trapped air is particularly desirable when my invention is embodied in a hydraulic settling means in which the principal purpose is to separate solids, more or less in suspension in a liquid, from the liquid, as distinguished from the separation of solids of different settling rates.

Figure 21:
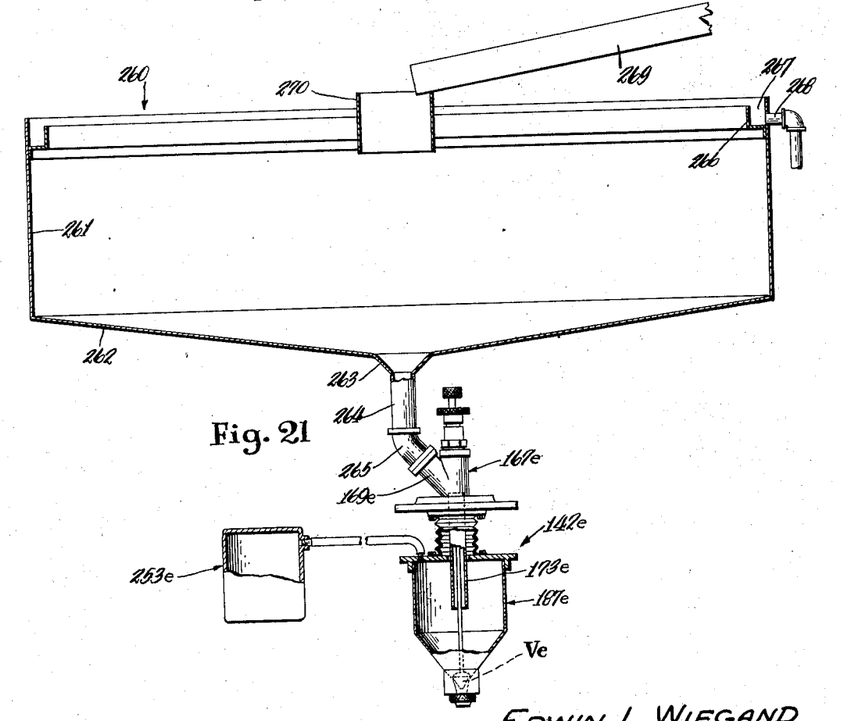
Figure 21 is a vertical sectional view, more or less diagrammatic, of another form of hydraulic settling means embodying my invention.

Referring now to Figure 21, there is here shown a hydraulic settling means 260 of the thickener or de-waterer type embodying my invention. This is a type of embodiment of my invention particularly adapted for handling pulps or suspensions, as will more fully appear. The settling means 260 is here shown as including a generally cylindrical tank 261 having a bottom 262 which may be somewhat conical as shown. Suitably connected to an outlet portion 263 at the center of the conical bottom 262 is an automatic discharge means 142e, parts of this discharge means similar to parts in Figures 13 through 18 bearing like reference numerals with the suffix *e* added. The automatic discharge means 142e is here shown as connected to the outlet portion 263 by a pipe 264 and an elbow 265, the latter being connected to the arm 169e of the Y pipe fitting 167e which is adapted to feed into the pipe 173e of the automatic discharge device. The pipe 173e extends into the sump 187e a considerable desired distance to provide a considerable volume of trapped air as explained in connection with Figure 18, and, if desired, the volume of trapped air may be further increased by the provision of an auxiliary receptacle 253e as also explained in connection with Figure 18.

The settling means 260 is here shown as including an annular member 266 of Z-like section suitably fastened to the inside surface of the cylindrical tank 261 so as to provide an annular trough or launder 267. The liquid in the launder 267 may be discharged through an outlet pipe 268.

Material to be de-watered or thickened may be fed to the settling means 260 by a trough or conduit 269, the discharge end of the conduit 269 being desirably near the center of the tank 261. The conduit 269 may discharge into a feed well 270 this being shown as a centrally located pipe section the upper and lower ends of which are respectively above and below the upper edge of the member 266. Any means (not shown) may be provided for supporting the feed well 270.

The material fed to the settling means 260 may be in the form of a "pulp" or suspension, in the sense of solid material suspended in a liquid, the solid component of which does not settle out rapidly. The settling means 260 operates, in general, as follows. The pulp is fed from the conduit 269 at a desired rate and the solid material gradually settles to the bottom 262 from which, either by gravity or with the use of rotatable rakes (not shown) or by both means, it flows as a thickened pulp into the sump 187e and is discharged through the valve Ve when the valve is open, it being understood that the sump 187e is counter-balanced by a suitably fulcrumed beam, and weight, such as the beam 101 and weight 104, as fully set forth in connection with previously described embodiments. The liquid overage component of the feed flows into the launder 267 and is discharged through the pipe 268. The underage material which accumulates at the bottom 262 of the settling means may be a thickened pulp of varying density and it is desired that this underage be discharged at some uniform selected density. Accomplishment of this desired result is made possible by the provision of a trapped substantial volume of air as hereinbefore described because thereby the sensitivity of the automatic discharge means is materially increased. This increase in sensitivity comes about by reason of the fact that a change in the condition or density of the underage pulp has the effect of changing the balance of the automatic discharge means thereby to adjust the valve Ve, for example, both directly by increased density and indirectly by compression of the trapped volume of air allowing a higher level of pulp to be carried in the sump 187e. Hence the automatic discharge means 142e, by adjustment of the valve Ve, regulates not only the rate of discharge in response to the density of the pulp but responds primarily to change in pulp density, so that the pulp discharged from the discharge means is of very uniform density.

Under conditions of application where a desired extra large volume of trapped air would require too large a sump 187e, the auxiliary chamber 253e is provided. Thereby a still more accurate control of the discharge from the automatic discharge device 142e is obtained.

It may be noted that "pulp" is usually such material that the solid component thereof would not have enough time to separate from the liquid to any material extent during the time of passing through the sump 187e of the material normally to be found in the sump. Hence, in the case of handling a pulp there is but one material level in the sump, namely, the pulp level, as distinguished from the case of the handling of a material in which the solid particles settle rapidly in the liquid with the result that there is present in the sump a wet solids level and above that a liquid level. Of course, between the extremes of a "pulp" and a rapidly settling material there is no definite demarkation, but for the extremes it may be stated, in general, that for a "pulp" a suitably large volume of trapped air should be provided whereas for a rapidly settling material a large volume is not necessary.

From the foregoing it will be apparent to those skilled in the art, that my invention provides new and improved separations, and new and improved hydraulic settling means, and new and improved underage discharge means for hydraulic settling means, and accordingly, accomplishes the objects of my invention. On the other hand, it also will be obvious to those skilled in the art that the disclosure herein is illustrative only, and that my invention is not limited thereto.

I claim:

1. In combination: hydraulic material settling means provided with a downwardly extending discharge pipe for discharging underage, control means, for controlling discharge of underage of said settling means, including valve means, receptacle means having an inlet and having an outlet controlled by said valve means, and means including an extensible and contractable connection comprising an approximately vertically disposed tubular bellows fastened at one end to said receptacle means and at the other end fixed relatively to said settling chamber, so constructed and arranged that said underage is adapted to be discharged through said connection and through said inlet into said receptacle means and said connection permits approximately vertical bodily movement of said receptacle means relatively to said settling means, said control means being so constructed and arranged as to permit discharge of underage in a continuous stream and so that said relative movement causes said valve means to control the rate of discharge of said underage from said outlet; an air-tight joint between said other end of said connection and said discharge pipe, said joint and said pipe and said connection being relatively so constructed and arranged that said pipe extends freely through said bellows downwardly from said joint to said receptacle means and air is trapped between said pipe and said bellows upon predetermined rise in level of underage in said receptacle means.

2. Apparatus for separating material particles, comprising: hydraulic material separating means, including a settling chamber provided with a downwardly extending discharge pipe for discharging underage; control means, for controlling discharge of underage of said hydraulic separating means, including valve means, receptacle means having an inlet and having an outlet controlled by said valve means, and means including an extensible and contractable connection fastened at one end to said receptacle means and at the other end fixed relatively to said settling chamber, so constructed and arranged that said underage is adapted to be discharged through said connection and through said inlet into said receptacle means and said connection permits approximately vertical bodily movement of said receptacle means relatively to said settling chamber, said control means being so constructed and arranged as to permit discharge of underage in a continuous stream and so that said relative movement causes said valve means to control the rate of discharge of said underage from said outlet; an airtight joint between said other end of said connection and said discharge pipe, said joint and said pipe and said connection being relatively so constructed and arranged that said pipe extends freely through said connection downwardly from said joint to said receptacle means and air is trapped between said pipe and said connection upon predetermined rise in level of underage in said receptacle means; and means for feeding liquid into said settling chamber through a wall portion thereof at a level higher than said joint, so constructed and arranged that particles fed to said separating means are subjected to hydraulic counter-current settling.

3. In combination: hydraulic material settling means including a chamber; control means, for controlling discharge of underage of said settling means, including a relatively stationary valve body and receptacle means having an inlet for receiving underage from said chamber, said receptacle means having an outlet providing a valve seat cooperable with said valve body and being so constructed and arranged that said valve seat is movable relatively to said valve body to control the rate of discharge of said underage from said outlet; a valve rod on which said valve body is mounted; and guide bearing means disposed within and carried by said receptacle means, said guide bearing means having an aperture through which said valve rod is disposed, and being constructed and arranged to prevent underage from clogging the cooperating surfaces of said bearing means and said rod.

4. In combination: hydraulic material settling means including a chamber; control means, for controlling discharge of underage of said settling means, including a relatively stationary valve body and receptacle means having an inlet for receiving underage from said chamber, said receptacle means having an outlet providing a valve seat cooperable with said valve body and being so constructed and arranged that said valve seat is movable relatively to said valve body to control the rate of discharge of said underage from said outlet; a valve rod on which said valve body is mounted; and guide bearing means disposed within and carried by said receptacle means, said guide bearing means having an aperture through which said valve rod is disposed, said aperture having circumferentially spaced marginal surface portions slidably engageable with said rod, said aperture comprising circumferentially spaced radially extending recesses between said marginal portions.

5. In combination: hydraulic material settling means; valve means, including relatively movable parts disposed in the discharge path of underage of said settling means, constructed and arranged to control the discharge of said underage; and means, including a fulcrum, and including also a beam having a portion intermediate its ends engaging a portion of said fulcrum and having an end operatively related to one of said valve parts, so constructed and arranged that said beam is adapted to bias said valve means toward closed position, the engaging portions of said beam and fulcrum being relatively so constructed and arranged that as said beam swings about said fulcrum the place of engagement of said portions is altered relatively to the ends of said beam so to alter the moment arms of said beam that increase of opening of said valve causes increase in said biasing force and decrease of opening of said valve causes decrease in said biasing force.

6. In combination: hydraulic material settling means; valve means, including relatively movable parts disposed in the discharge path of underage of said settling means, constructed and arranged to control the discharge of said underage; and means, including a fulcrum, and including also a beam having a portion intermediate its ends engaging a portion of said fulcrum and having an end operatively related to one of said valve parts, so constructed and arranged that said beam is adapted to bias said valve means toward closed position, the engaging portions of said beam and fulcrum being relatively so constructed and arranged that as said beam swings about said fulcrum the place of engagement of said portions is altered relatively to the ends of said beam so to alter the moment arms of said beam that increase of opening of said valve causes increase in said biasing force and decrease of opening of said valve causes decrease in said biasing force; and separate means preventing relative sliding movement of said portions.

7. In combination: hydraulic material settling means; valve means, including relatively movable parts disposed in the discharge path of underage of said settling means, constructed and arranged to control the discharge of said underage; means, including a fulcrum, and including also a beam having a portion intermediate its ends engaging a portion of said fulcrum and having an end operatively related to one of said valve parts, so constructed and arranged that said beam is adapted to bias said valve means toward closed position, the engaging portions of said beam and fulcrum being relatively so constructed and arranged that as said beam swings about said fulcrum the place of engagement of said portions is altered relatively to the ends of said beam so to alter the moment arms of said beam that increase of opening of said valve causes increase in said biasing force and decrease of opening of said valve causes decrease in said biasing force; and means for relatively adjusting said portions to alter the place of engagement of said portions relatively to the ends of said beam so that the moment arms of said beam are altered independently of swinging of said beam.

8. In combination: hydraulic material settling means having outlet means adapted to discharge underage, said outlet means including control means constructed and arranged to adjust the rate of discharge of underage from said outlet means; said control means including chamber means having underage inlet means and discharge outlet means and being airtight except for said inlet means and outlet means; said chamber means including receptacle means, and expansible and contractable connection means suspending said receptacle means, constructed and arranged to permit said receptacle means to assume a position dependent upon the weight of underage in said receptacle means thereby to control the discharge of underage from said discharge outlet; means whereby air is adapted to be trapped in said chamber means by a rise of liquid level in said receptacle means to a selected level below the lowest normal operating level, in an amount to permit further rise of liquid level, by compression of said air, to normal operating levels appreciably higher than said selected level; and said chamber means including separate airtight auxiliary vessel means constructed and arranged to enlarge the trapped-air capacity of said chamber means.

9. In combination: hydraulic material settling means including a settling chamber; control means, for controlling discharge of underage of said settling means, including a relatively stationary valve body and receptacle means having an inlet for receiving the underage from said chamber, said receptacle means having an outlet providing a valve seat cooperable with said valve body and being so constructed and arranged that said valve seat is movable relatively to said valve body to control the rate of discharge of said underage from said outlet; means, disposed approximately at the level of said valve seat and cooperable with exterior surface of said receptacle means, constructed and arranged to guide said movement of said valve seat; a valve rod on which said valve body is mounted; and guide bearing means disposed within and carried by said receptacle means, said guide bearing means having an aperture through which said valve rod is disposed, said aperture being at a level substantially above said valve seat.

10. In combination: hydraulic material settling means; control means, including a valve for controlling discharge of underage of said settling means, and means, including a biasing weight, constructed and arranged to provide a force biasing said valve toward closed position; said control means being so constructed and arranged that said valve tends to open, against said biasing force, dependent upon the weight of the undischarged underage thereby automatically to adjust the rate of discharge of said underage; and means whereby increase of opening of said valve causes increase in the biasing force provided by said weight and decrease of opening of said valve causes decrease in the biasing force provided by said weight.

11. In combination: hydraulic material settling means having an opening for discharging underage; control means, for controlling discharge of underage of said settling means, including valve means, receptacle means having an inlet and having an outlet controlled by said valve means, and means including an extensible and contractible connection between said receptacle means and said settling means, said connection comprising an approximately vertically disposed tubular bellows, so constructed and arranged that said underage is adapted to be discharged through said tubular bellows and through said inlet into said receptacle means and said connection permits approximately vertical bodily movement of said receptacle means relative to said settling means, said control means being so constructed and arranged as to permit discharge of underage in a continuous stream and so that said relative movement causes said valve means to control the rate of discharge of said underage from said outlet; means constructed and arranged to keep inside surfaces of said bellows free of material fed to said settling means; and means for feeding liquid into said settling means at a level higher than said connection, so constructed and arranged that particles fed to said settling means are subjected to hydraulic counter-current settling.

12. In combination: a hydraulic jig having a hutch; control means, including a valve for controlling discharge of hutch product from said hutch, and means providing a force biasing said valve toward closed position; said control means being so constructed and arranged that said valve tends to open, against said biasing force, dependent upon the weight of undischarged hutch product thereby automatically to adjust the rate of discharge of said hutch product; and means whereby increase of opening of said valve causes increase in said biasing force and decrease of opening of said valve causes decrease in said biasing force.

13. In combination: hydraulic material settling means comprising a settling chamber; underage outlet means including means for automatically controlling the discharge of underage from said outlet means; said outlet means comprising conduit means extending downwardly from said chamber, at an angle to the vertical to said automatic control means; said automatic control means comprising a valve body; and means, including a rod connected to said valve body and extending upwardly through a wall of said conduit means and free of the confines of said settling chamber, constructed and arranged to adjust said valve body.

14. In combination: a hydraulic jig having a hutch; outlet means for the product yielded in said hutch, said outlet means including control means comprising means for receiving hutch product from said hutch, said control means being constructed and arranged automatically to adjust the rate of discharge of hutch product from said outlet means dependent upon the weight of undischarged hutch product in said receiving means; and means constructed and arranged to reduce the effect on said control means of hydraulic pulsations in said jig transmitted to the contents of said receiving means.

15. In combination: a hydraulic jig having a hutch; outlet means for the product yielded in said hutch, said outlet means including control means comprising means for receiving hutch product from said hutch, said control means being constructed and arranged automatically to adjust the rate of discharge of hutch product from said outlet means dependent upon the weight of undischarged hutch product in said receiving means; and means, including air trap means providing a body of air adapted to act as a cushion against hydraulic pulsations in said jig, constructed and arranged to reduce the effect on said control means of hydraulic pulsations in said jig transmitted to the contents of said receiving means.

EDWIN L. WIEGAND.

CERTIFICATE OF CORRECTION.

Patent No. 2,369,878. February 20, 1945.

EDWIN L. WIEGAND.

It is hereby certified that error appears in the printed specification of the above numbered patent requiring correction as follows: Page 6, first column, line 2, for "0.010 percent" read --0.10 percent--; and second column, line 14, for "average" read --overage--; and that the said Letters Patent should be read with this correction therein that the same may conform to the record of the case in the Patent Office.

Signed and sealed this 19th day of June, A. D. 1945.

Leslie Frazer (Seal)  Acting Commissioner of Patents.